United States Patent
Yu et al.

(10) Patent No.: US 8,131,876 B2
(45) Date of Patent: Mar. 6, 2012

(54) BIDIRECTIONAL SIGNAL TRANSMISSION APPARATUS AND METHOD

(75) Inventors: Jin Fei Yu, Beijing (CN); Junbiao Zhang, Beijing (CN); Zhi Gang Zhang, Beijing (CN); Heinrich Schemmann, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 108 days.

(21) Appl. No.: 12/310,828

(22) PCT Filed: Sep. 12, 2007

(86) PCT No.: PCT/EP2007/059602
§ 371 (c)(1),
(2), (4) Date: Nov. 4, 2009

(87) PCT Pub. No.: WO2008/031856
PCT Pub. Date: Mar. 20, 2008

(65) Prior Publication Data
US 2010/0064330 A1 Mar. 11, 2010

(30) Foreign Application Priority Data
Sep. 12, 2006 (CN) .......................... 2006 1 0152048

(51) Int. Cl.
*G06F 15/16* (2006.01)
(52) U.S. Cl. ........................................ 709/246
(58) Field of Classification Search ............... 709/246; 725/109
See application file for complete search history.

(56) References Cited

U.S. PATENT DOCUMENTS

| 7,765,309 B2 * | 7/2010 | Spearman et al. ............ 709/229 |
| 2004/0158649 A1 | 8/2004 | Ophir et al. |
| 2006/0031894 A1 * | 2/2006 | Petruzzelli .................... 725/100 |

FOREIGN PATENT DOCUMENTS
WO  WO 2005/062611  7/2005

OTHER PUBLICATIONS
Search Report Dated Dec. 13, 2007.

* cited by examiner

Primary Examiner — Jerry Dennison
(74) Attorney, Agent, or Firm — Tutunjian & Bitetto, P.C.

(57) ABSTRACT

The present invention relates a bidirectional signal transmission apparatus and method, wherein said apparatus comprises a processor unit connected in signal communication with an Ethernet, an RF modulation/demodulation unit, and an RF frequency conversion unit connected in signal communication with a coaxial cable network. The data signal input from the Ethernet is modulated into standard IEEE802.11 signal by means of said signal processing unit and RF modulation/demodulation unit, and then down-converted from 2.4 GHz or 5.8 GHz standard IEEE802.11 signal to a range of 500 MHz to 2000 MHz, and preferably to a range of 900 MHz to 1200 MHz. The bidirectional transmission apparatus further includes a frequency band selector for selecting different frequency bands so as to broaden the bandwidth of the signal and a real broad band data transmission is accomplished.

14 Claims, 4 Drawing Sheets

BIDIRECTIONAL SIGNAL TRANSMISSION APPARATUS AND METHOD

This application claims the benefit, under 35 U.S.C. §365 of International Application PCT/EP2007/059602, filed Sep. 12, 2007, which was published in accordance with PCT Article 21(2) on Mar. 20, 2008 in English and which claims the benefit of Chinese patent application No. CN200610152048.X, filed Sep. 12, 2006.

FIELD OF THE INVENTION

The present invention relates to technology of bidirectional signal communication, and more particularly to a bidirectional signal transmission apparatus and method for data communication between Ethernet and coaxial cable network by using IEEE802.11 standard signal.

BACKGROUND OF THE INVENTION

Along with the rapid development and wide application of wireless network system, and the popularization of cable TV network, many different solutions using the technology of transmission data signal in line with relevant wireless communication standard through existing coaxial cable of CATV network have been presented in recent years. On the other hand, signal transmission through existing CATV network will possess a large market share due to its high transmission efficiency and economic interests. However, the conventional wireless network uses 2.4 GHz or 5.8 GHz frequency is not suitable for signal transmission through the coaxial cable. The existing technical solution is modulating the wireless data signal, and then converting the modulated wireless data signal into a specific frequency range which is adapted for transmission through the coaxial cable.

For example, in the technology of WLAN using IEEE802.11 standard communication protocol, some signal combination apparatus, such as multiplexer for combining received IEEE802.11 wireless signal with the signal of CATV and transmitting signal through the coaxial cable, in order to use the coaxial cable of existing CATV network to transmit wireless signal from outside of the building to the subscribers in the building. The object of this solution is to extend wireless signal from external into internal of a building, so as to achieve a seamless coverage of the wireless signal and to ensure the quality of service.

Presently, there exist various types of applications for signal transmission through coaxial cable of CATV network. For example, UClink system is developed by Shenzhen Huawei based on ASIC protocol, of which the uplink and downlink frequency carriers are different frequency, instead of the IEEE802.11 standard protocol for data communication. Another existing technical solution adopts standard WIFI products, which transmits WIFI signal through the coaxial cable instead of antenna. A problem of this solution is that high frequency signal has only limited transmission distance, and the service providers of the network have to modify the original devices, e.g. band splits and transceivers etc. in order for proper use.

One Chinese patent application CN620132 discloses an integrated system for CATV network data transmission, which converts the IEEE802.11 signal down to 0-65 MHz signal for transmission through the coaxial cable network, characterized in that the standard IEEE802.11 signal of 2.4 GHz is converted to 0-65 MHz in a manner of OFDM (orthogonal frequency division multiplexing) with QAM (Quadrature Amplitude Modulation) or QPSK (Quadrature Phase Shift Keying) etc., and then transmitted through the coaxial cable network. Its frequency band range is partially overlapped with the CATV frequency, e.g. the CATV channel for Northern America which is about 54-550 MHz (except for 88 MHz to 108 MHz for the wireless frequency). Moreover, it is almost impossible to allocate more than one non-interference channel within such a narrow band width.

Another kind of known technical solution for transmitting signal through the coaxial cable converts the IEEE802.11 standard wireless signal from 2.4 GHz down to about 900-2000 MHz prior to transmitting the signal through the coaxial cable. For example, as illustrated in FIG. 1, an existing WIFI signal transceiver is provided for modulating the received WIFI signal, converting it into a suitable frequency band range, and then transmitting the converted signal through the coaxial cable. The signal transceiver comprises a processor unit 1a, an RF modulation/demodulation unit 2a, a tuner 4a and an RF frequency conversion unit 3a. The processor unit 1a has an interface connected in signal communication with an Ethernet network.

During the downlink transmission, the Ethernet data signal is received by the processor unit 1a through the interface from the Ethernet and transformed into WIFI standard baseband signal. Then the WIFI standard baseband signal is transmitted to the RF modulation/demodulation unit 2a. Conventionally, the 2.4 GHz WIFI signal range is divided into a number of smaller bands or 'channels'. For example, in IEEE802.11b and IEEE802.11g standards, there are 13 channels for selection. The modulation/demodulation unit 2a modulates the WIFI standard baseband signal to frequency of 2.4 GHz or 5.8 GHz while a channel is selected by means of tuner 4a. And then the 2.4 GHz or 5.8 GHz signal is transmitted to the RF frequency conversion unit 3a, at which the 2.4 GHz or 5.8 GHz signal is down-converted into a range of 900 MHz to 2000 MHz to be transmitted through the coaxial cable. Such a frequency down-conversion is to avoid the specific frequency band being used by the CATV in order to prevent the signal of CATV from the interference. As shown in FIG. 2, when the client receives the signal with the down-converted frequency, at first, the down-converted frequency is up-converted into a signal of 2.4 GHz or 5.8 GHz by the RF frequency conversion unit 3a'. Then a channel of the 2.4 GHz or 5.8 GHz signal is selected and the signal is demodulated at unit 2a' to a base band signal. The base band signal is converted by the processor unit 1a' to an Ethernet data signal.

The uplink transmission is carried out in the opposite sequence to the down link one, and can be understood by referring to the description of the downlink and will not be further described here.

However, the conventional technology has a limitation on the bandwidth, so that it can not support multiple (e.g. five) non-overlapping channels. Therefore, it is desirable to develop an improved technical solution, which overcomes drawbacks and limitations of the prior arts.

SUMMARY OF THE INVENTION

The present invention aims to overcome foregoing obstacles of the conventional technologies, and to provide a signal transmission apparatus and method for modulating/converting signal of a standard wireless transmission network, for example standard IEEE802.11 signal, into a signal suitable to be transmitted through a coaxial cable network, where a standard wireless network signal is modulated and converted down from 2.4 GHz into a range of 500 MHz to 2000 MHz, and transmitted through the coaxial cable network over a long distance, and meanwhile selected to work on different frequency ranges by frequency band selector so as to obtain a broadened frequency band range which supports more multiple user access service.

In an aspect, a signal transmission apparatus at the server end for transmission data signal over a coaxial cable is disclosed. It comprises a processor unit for transforming the data signal from the server into a first signal during the first transmission direction or transforming the first signal into the data signal during the second transmission direction; a modulation/demodulation unit for modulating the first signal from said processor unit to a second signal at a first frequency band during the first transmission direction or demodulating the second signal at the first frequency band to the first signal during the second transmission direction; a tuner for selecting a channel from the first frequency band to transmit the first signal during the first direction, or select a channel from the first frequency band to transmit the second signal during the second direction; a frequency conversion unit for converting the first frequency band of the second signal to a low frequency band during the first transmission direction and converting the low frequency band of the second signal to the first frequency band of the second signal during the second transmission direction; and a frequency band selector for extending the low frequency band of the second signal to a broader one during the first transmission direction and for narrowing the broader frequency band to the low frequency band during the second transmission direction.

Wherein the first transmission direction is downlink transmission direction which is from the server end to the client end, and the second transmission direction is uplink transmission direction which is from the client end to the server end. The data signal is an Ethernet data signal. The first signal is an IEEE802.11 compliant base band signal. The second signal is IEEE802.11 compliant signal and the first frequency is 2.4 GHz or 5.8 GHz. In the transmission apparatus at the server end, wherein extending the frequency band of the low frequency signal is carried out by adapting a local oscillator at the frequency band selector.

In another aspect, a signal transmission apparatus at the client end for transmission data signal over a coaxial cable is provided, which comprises a processor unit for transforming the data signal from the client into a third signal during the third transmission direction or transforming the third signal into the data signal during the fourth transmission direction; a modulation/demodulation unit for modulating the third signal from said processor unit to a fourth signal at a third frequency band during the third transmission direction or demodulating the fourth signal at the third frequency band to the third signal during the fourth transmission direction; a tuner for selecting a channel from the third frequency band to transmit the third signal during the third direction, or select a channel from the third frequency band to transmit the fourth signal during the fourth direction; a frequency conversion unit for converting the third frequency band of the fourth signal to a low frequency band during the third transmission direction and converting the low frequency band of the fourth signal to the third frequency band of the fourth signal during the fourth transmission direction; a frequency band selector for extending the low frequency band of the fourth signal to a broader one during the third transmission direction and for narrowing the broader frequency band to the low frequency band during the fourth transmission direction.

Wherein the third transmission direction is uplink transmission direction which is from the client end to the server end and the fourth transmission direction is downlink transmission direction which is from the server end to the client end. The data signal is an Ethernet data signal. The third signal is an IEEE802.11 compliant base band signal. The fourth signal is IEEE802.11 compliant signal and the third frequency is 2.4 GHz or 5.8 GHz. In the transmission apparatus at the client end, wherein extending the frequency band of the low frequency signal is carried out by adapting a local oscillator at the frequency band selector.

Advantageously the frequency range of said signal is broadened after process, therefore, the frequency band width for signal transmission is broadened, and a real broadband data transmission is accomplished.

DETAILED DESCRIPTION OF PREFERRED EMBODIMENTS

The present invention relates to a bidirectional signal transmission apparatus and method for modulating/converting IEEE802.11 standard signal (also called as WIFI signal) and transmitting the modulated/converted signal through a coaxial cable network, so as to accomplish a cost saving bidirectional signal transmission solution based on the existing CATV network.

Figure 1:
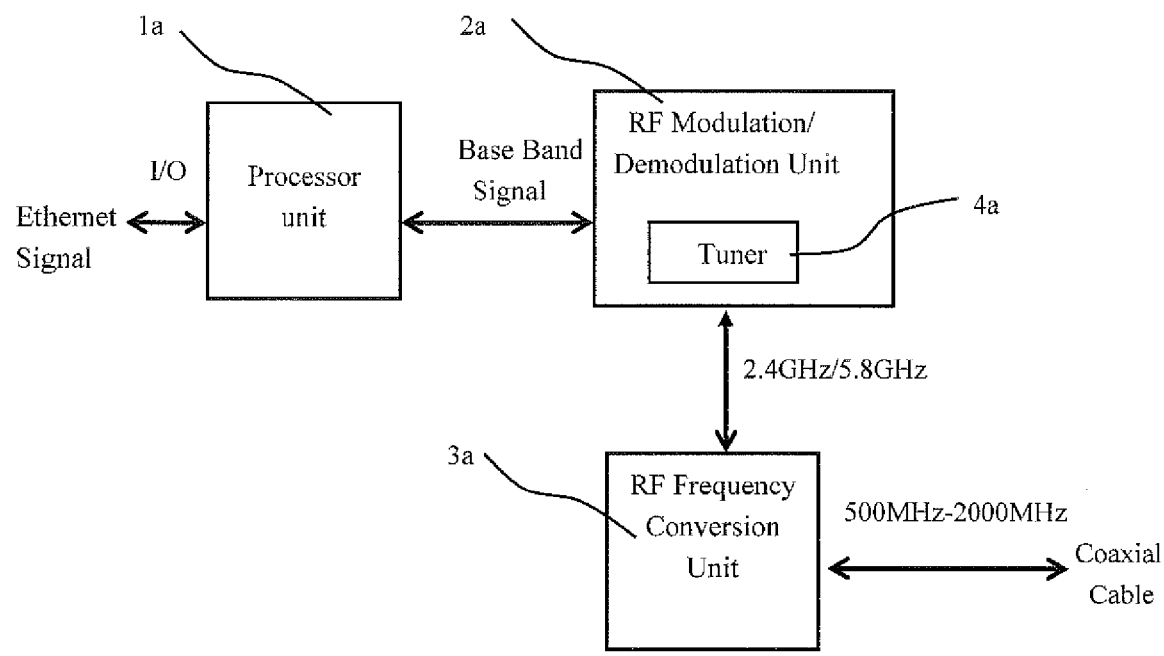
FIG. 1 is a schematic diagram showing a conventional WIFI signal transceiver at the server end in a CATV network.
Figure 2:
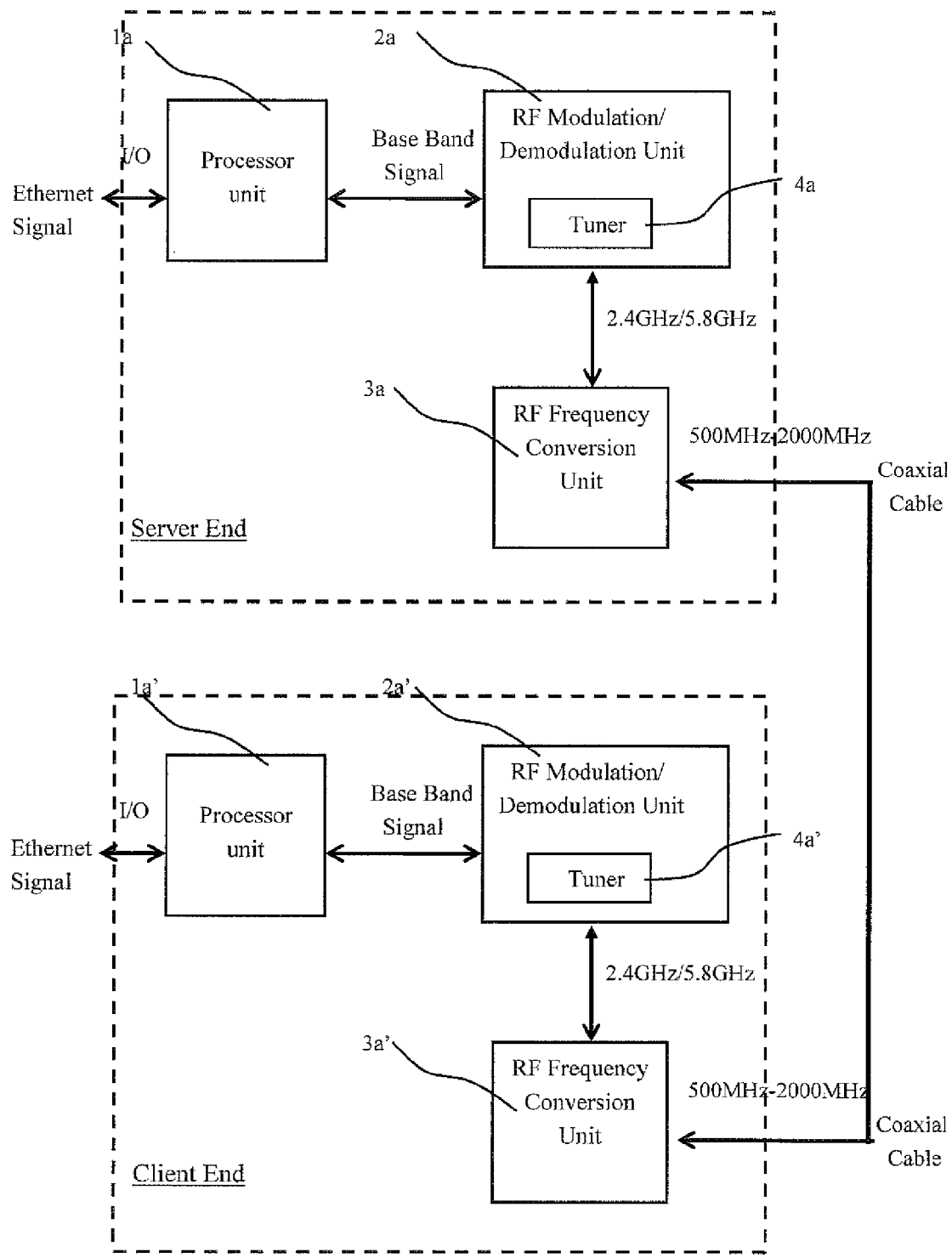
FIG. 2 is a schematic diagram showing the conventional transmission system including both the server end and the client end.
Figure 3:
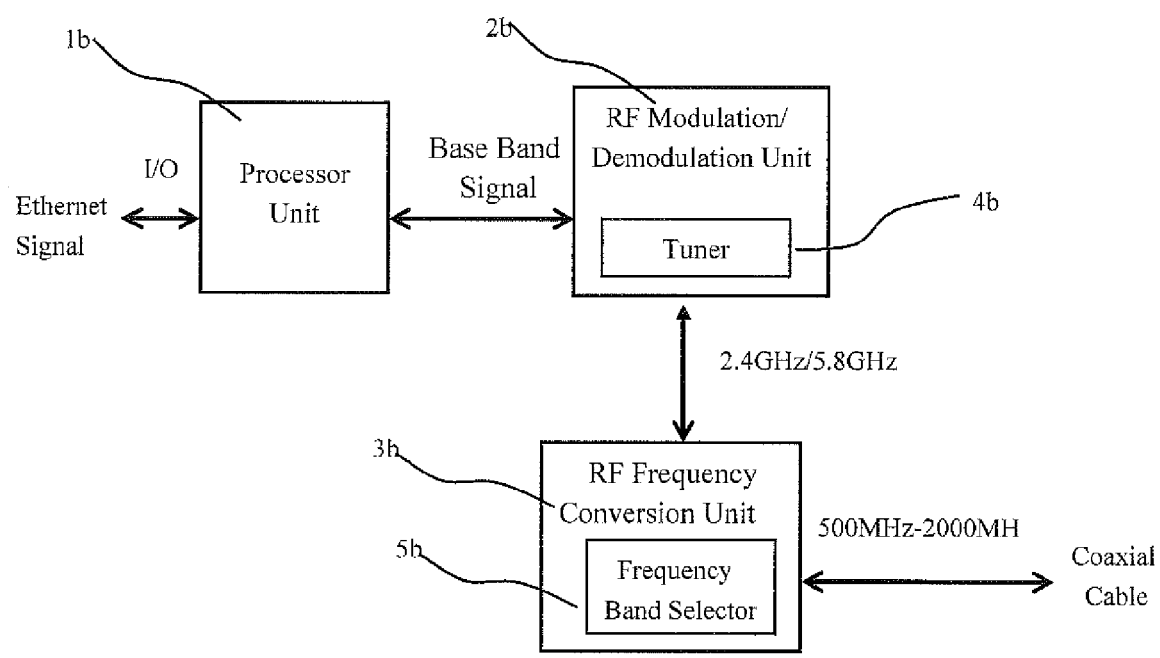
FIG. 3 is a schematic diagram showing one embodiment of a WIFI signal transceiver at the server end in the CATV network in accordance with the present invention.
Figure 4:
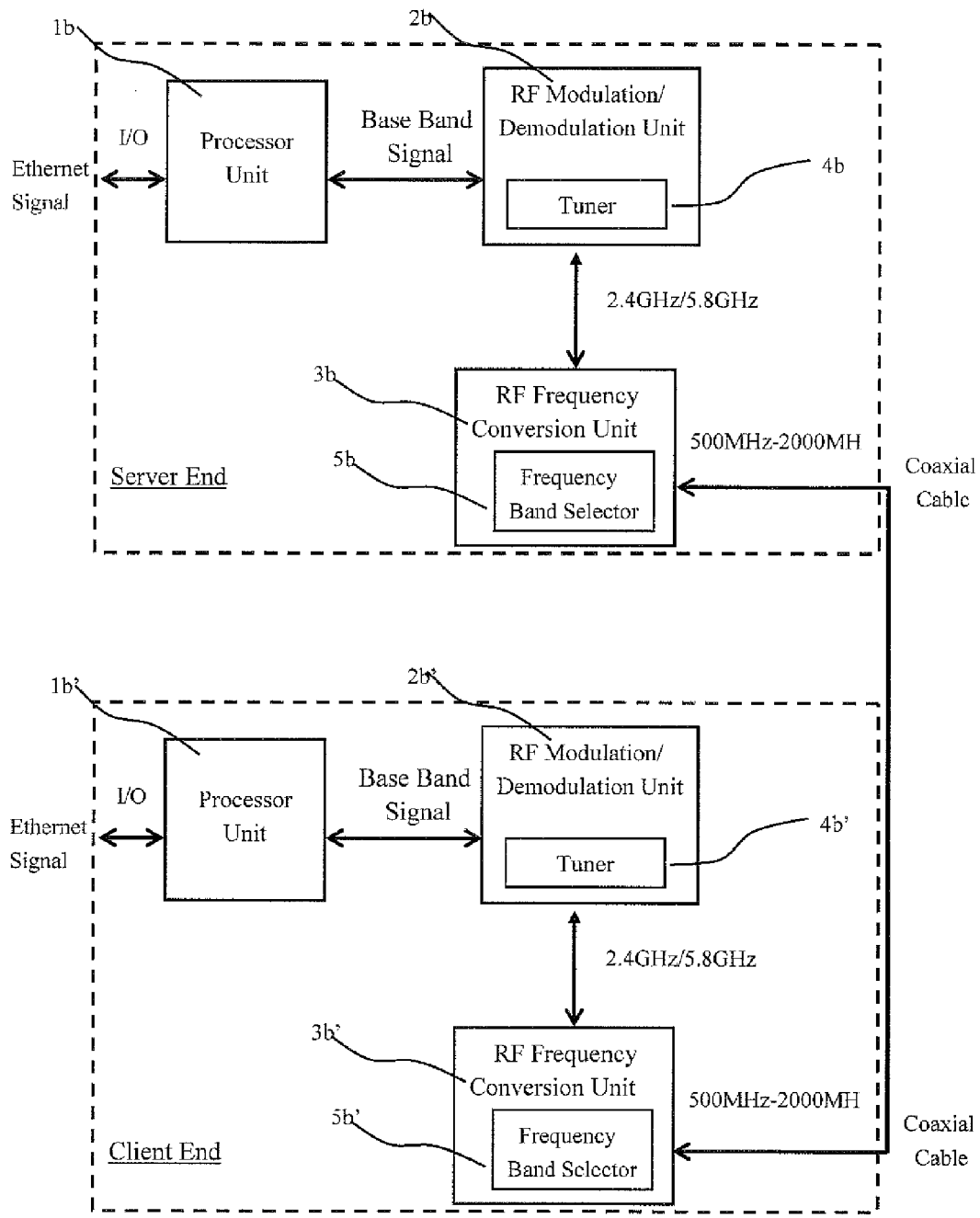
FIG. 4 is a schematic diagram showing one embodiment of the whole transmission system including both the server end and the client end.

FIG. 3 is a diagram illustrating a simplified structure of a signal transceiver at the server end according to an embodiment. Similar to the traditional transceiver as shown in FIG. 1, the inventive transceiver comprises a processor unit 1b, an RF modulation/demodulation unit 2b, and an RF frequency conversion unit 3b. The processor unit 1b is provided with an interface which is connected in signal communication with an I/O port of an Ethernet network, and another interface which is connected in signal communication with the RF modulation/demodulation unit 2b. During the downlink transmission, the signal received from the Ethernet network is transformed into IEEE802.11 base band signal, and then passed to the RF modulation/demodulation unit 2b by the processor unit 1b. Similar to the prior art, the modulation/demodulation unit 2b is provided therein with a tuner 4b, and the IEEE802.11 base band signal is modulated by the modulation/demodulation unit 2b and a channel is selected by the tuner 4b. And then the modulated signal on the selected channel is output to the RF frequency conversion unit 3b, at which the 2.4 GHz or 5.8 GHz IEEE802.11 signal is down-converted to a signal of 500 MHz~2000 MHz, e.g. a WiFi signal is moved onto 500 MHz~583 MHz frequency band from 2.4 GHz~2.483 GHz frequency Band. Meanwhile there is a frequency band selector 5b which is used to select different frequency bands for the down-converted signal. The frequency bands can be selected depending on needs, e.g. 500 MHz, 900 MHz, 960 MHz, 1100 MHz bands etc., and thus the frequency band range is extended from 500 MHz~583 MHz frequency band to 900 MHz~983 MHz frequency band, 960 MHz~1043 MHz frequency band and 1100 MHz~1183 Hz frequency band etc. accordingly. Therefore, it is possible to support more non-interference channels by the broadened overall frequency band range, and a broad band access is accomplished. The frequency band selector 5b in this embodiment includes a local oscillator. By adapting the frequency of the local oscillator the signal can be transmitted on different frequency bands therefore the bandwidth is broadened. As can be seen in FIG. 4, when the signal is transmitted over the coaxial cable at the client end, the 500 MHz~2000 MHz signal is selected by frequency band selector 5b', and then the selected frequency band is up-converted by the RF frequency conversion unit 3b' to 2.4 GHz or 5.8 GHz signal. In the next step a channel is tuned by the tuner 4b' and the converted signal is demodulated by the RF modulation/demodulation unit 2b' to a base band signal. Finally the base band signal is transformed by the processor unit 1b' into the Ethernet data signal.

During the uplink transmission, the data signal from the client end is processed in an opposite sequence of the downlink transmission, which can be known by the forgoing description of the downlink process and by the illustration of FIG. 4 and will not be described here.

As can be appreciated from FIG. 4, the inventive bidirectional signal transmission method which is used to transmission data signal over coaxial cable from the server to the client end is accomplished by using the inventive transceiver. The downlink transmission comprises steps of transforming data signal received from the Ethernet network to IEEE802.11 standard base band signal, modulating the transformed base band signal while selecting a suitable channel for the signal prior to transmitting the signal through the coaxial cable. Then said modulated signal is down-converted from 2.4 GHz or 5.8 GHz IEEE802.11 standard signal to 500 MHz~2000 MHz, preferably 900~1200 MHz. Meanwhile a frequency band selection is made to extend the original frequency band to other frequency band. For example, from 500 MHz~583 MHz frequency band to 900 MHz~983 MHz frequency band, or 960 MHz~1043 MHz frequency band, or 1100 MHz~1183 MHz. Thus it is possible to support more non-interference channels and a broadband access is accomplished. The movement of the frequency bands can be carried out by a local oscillator at the frequency band selector 5b by adapting the local oscillator at different frequencies. At the client end, the 500 MHz~2000 MHz signal is first selected and then is up-converted to 2.4 GHz or 5.8 GHz IEEE802.11 standard signal. And then a channel is selected and the up-converted signal is demodulated and transformed into IEEE802.11 base band signal, which is subsequently processed in the processor unit 1b into normal data signal and is output to the Ethernet network.

Preferably, besides the above mentioned frequency band selector 5b, there may further employ multiple frequency band selectors to further broaden the frequency range to, e.g. 1 GHz or 2 GHz. Thus it is applicable to transmit the IEEE802.11 standard signal through the coaxial cable network so as to accomplish a broad band technical solution.

Though it is described by using the examples of IEEE802.11b, and IEEE802.11g, the principle mentioned in the context can be used in other wireless signals. Although the embodiments which incorporates the teachings of the present invention has been shown and described in detail here, those skilled in the art can readily revise many other varied embodiments that still incorporate these teachings. It is noted that modifications and variations can be made by persons skilled in the art in light of the above teachings. It is to be understood that those units or devices described in the embodiments can be integrated in different ways have the similar effects.

The invention claimed is:

1. A signal transmission method for transmission of a first data signal from a first network to a second network, comprising steps of
transforming the first data signal into a second data signal, modulating the second data signal for obtaining a third signal occupying a first frequency band, and
selecting a channel from the first frequency band, characterized in that it further comprising a step of
shifting said channel to a selected frequency band, wherein said selected frequency band is selected among a plurality of frequency bands.

2. The signal transmission method according to claim 1, wherein the first data signal is an Ethernet data signal.

3. The signal transmission method according to claim 1, wherein the second data signal is an IEEE802.11x compliant base band signal.

4. The signal transmission method according to claim 3, wherein the second data signal is IEEE802.11x compliant signal and the first frequency band starts from 2.4 GHz or 5.8 GHz.

5. The signal transmission method according to claim 4, wherein said selected frequency band is selected by adapting a local oscillator at a selected frequency.

6. The signal transmission method according to claim 5, wherein the first network is a wireless local area network and the second network is coaxial cable network.

7. The signal transmission method according to claim 1, wherein the plurality of frequency bands includes 900 MHz~983 MHz, 960 MHz~1043 MHz, and 1100 MHz~1183 MHz.

8. A signal transmission apparatus for transmission of a first data signal from a first network to a second network, said apparatus comprising
a processor unit for transforming the first data signal into a second data signal,
a modulation/demodulation unit for modulating the second signal for obtaining a third signal occupying a first frequency band; and
a tuner for selecting a channel from the first frequency band;
wherein the apparatus further comprising
a frequency conversion unit for shifting said channel to a selected frequency band, wherein said selected frequency band is selected by the apparatus among a plurality of frequency bands.

9. The signal transmission apparatus according to claim 8, wherein the first data signal is an Ethernet data signal.

10. The signal transmission apparatus according to claim 9, wherein the second data signal is an IEEE802.11x compliant base band signal.

11. The signal transmission apparatus according to claim 10, wherein the second signal is IEEE802.11x compliant signal and the first frequency band starts from 2.4 GHz or 5.8 GHz.

12. The signal transmission apparatus according to claim 11, said selected frequency band is selected by adapting a local oscillator at a selected frequency.

13. The signal transmission apparatus according to claim 12, wherein the first network is a wireless local area network and the second network is coaxial cable network.

14. The signal transmission apparatus according to claim 13, wherein the plurality of frequency bands includes 900 MHz~983 MHz, 960 MHz~1043 MHz, and 1100 MHz~1183 MHz.

* * * * *